(No Model.) 5 Sheets—Sheet 1.
S. LUDLOW.
Twine Finishing Machine.
No. 234,305. Patented Nov. 9, 1880.
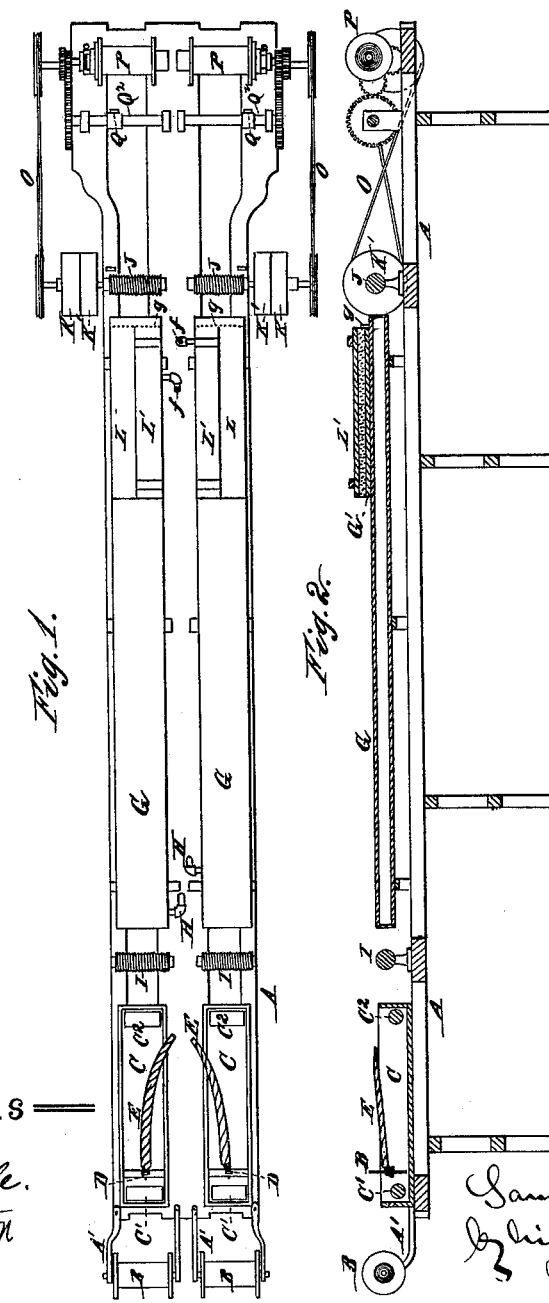
WITNESSES
Charlie R. Searle.
Charles C. Stetson.
INVENTOR
Samuel Ludlow
by his attorney
J. L. Stetson

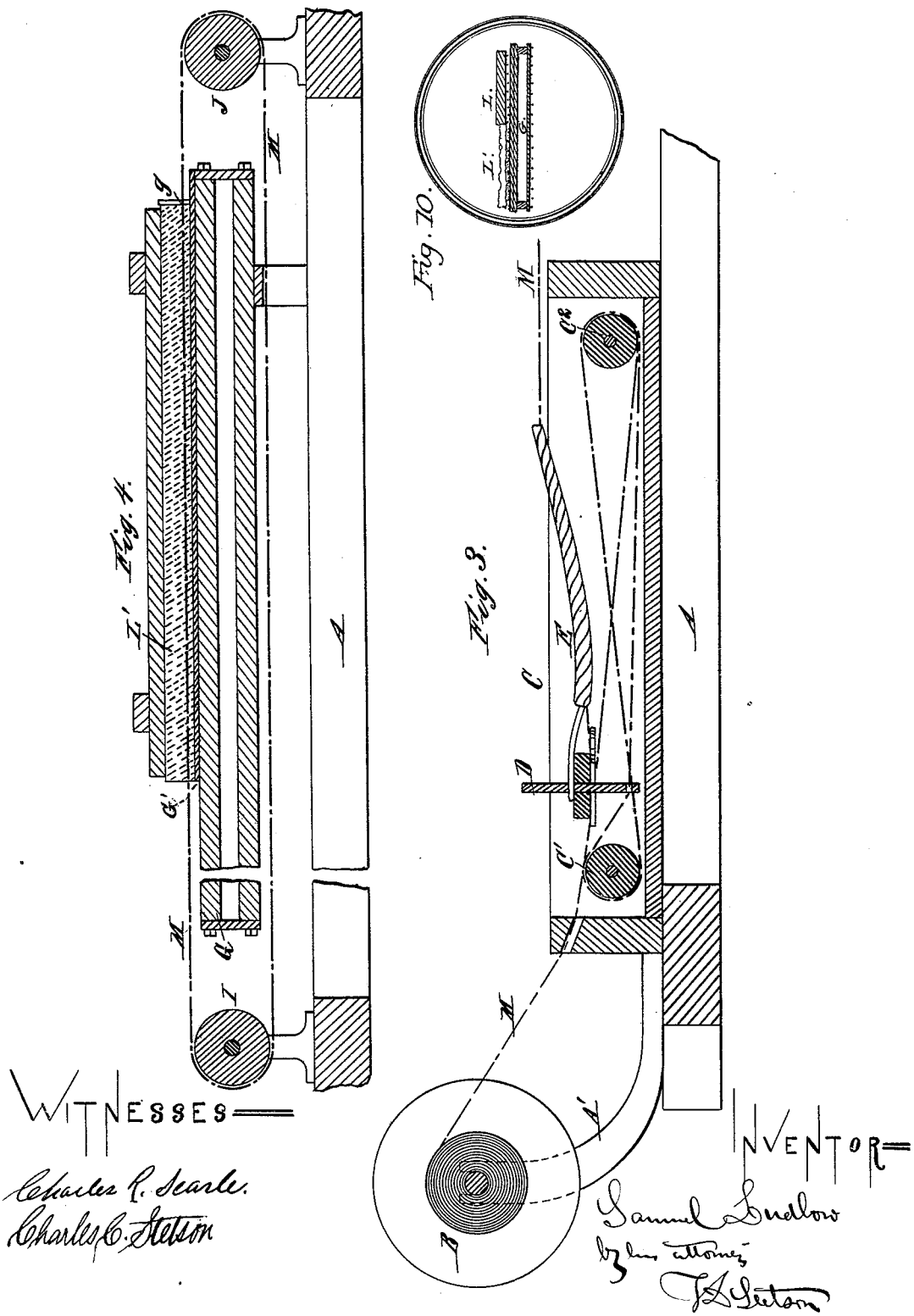

(No Model.) 5 Sheets—Sheet 3.
S. LUDLOW.
Twine Finishing Machine.
No. 234,305. Patented Nov. 9, 1880.
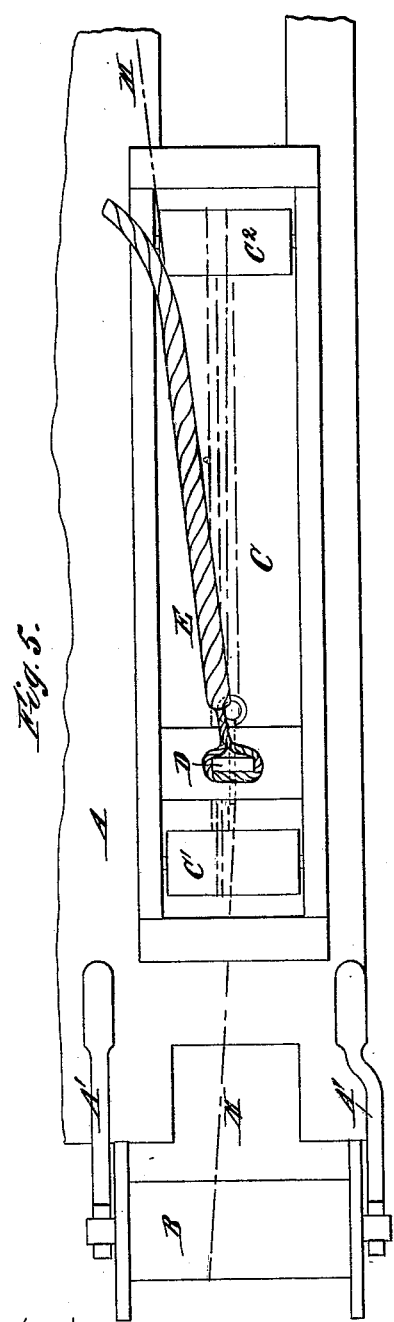
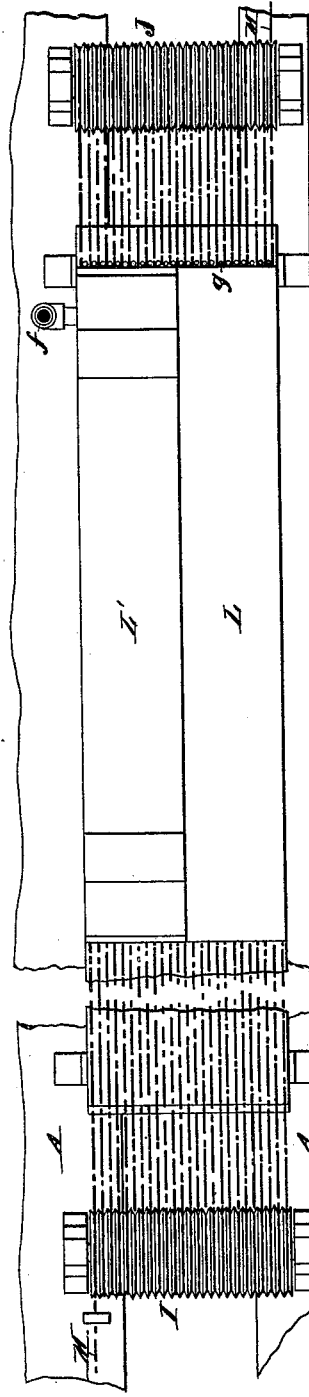
Witnesses:
Charles R. Searle
Charles C. Stetson
Inventor:
Samuel Ludlow
by his attorney J. C. Stetson (No Model.) 5 Sheets—Sheet 4.
S. LUDLOW.
Twine Finishing Machine.
No. 234,305. Patented Nov. 9, 1880.
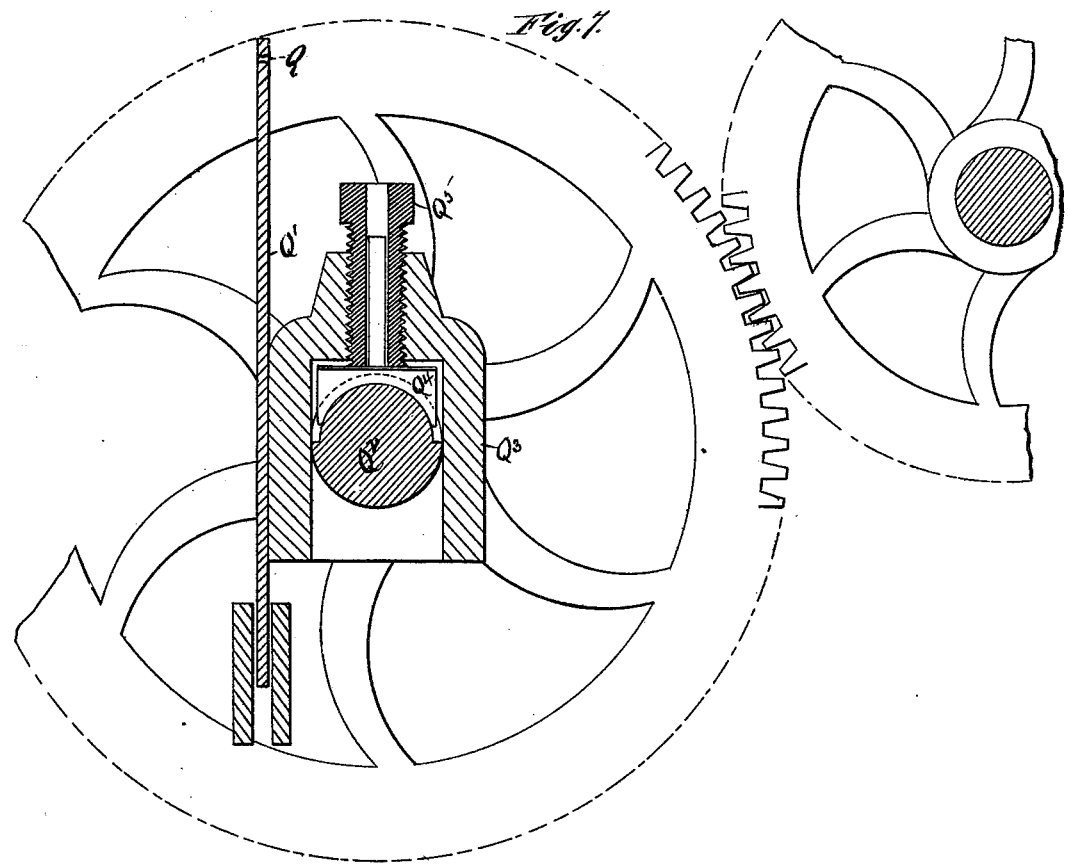
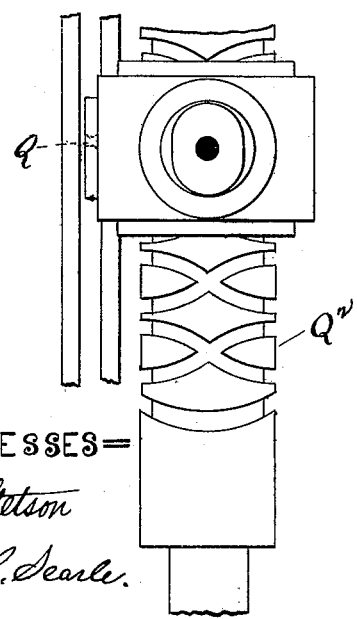
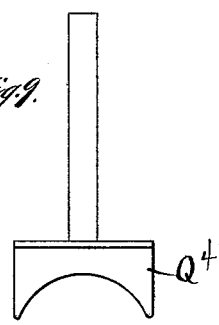

(No Model.)

5 Sheets—Sheet 5.

S. LUDLOW.
Twine Finishing Machine.

No. 234,305. Patented Nov. 9, 1880.

Witnesses:
Charles C. Stetson
Edw. D. Stafford

Inventor:
Samuel Ludlow
by his attorney
T. D. Stetson.

UNITED STATES PATENT OFFICE.

SAMUEL LUDLOW, OF BROOKLYN, NEW YORK.

TWINE-FINISHING MACHINE.

SPECIFICATION forming part of Letters Patent No. 234,305, dated November 9, 1880.

Application filed May 19, 1880. (No model.)

*To all whom it may concern:*

Be it known that I, SAMUEL LUDLOW, of Brooklyn, Kings county, in the State of New York, have invented certain new and useful Improvements relating to Twine-Finishing Machines, of which the following is a specification.

I carry the twine from a bobbin or receptacle through a tank of sizing and move it partially around rollers many times therein, thereby thoroughly working the sizing into the center of the twine. On leading it out I take it several times around a suitable snugger, which removes the surplus sizing. I then lead the smoothly-wiped but thoroughly-saturated twine through the open air, back and forward, near a steam-heated vessel, leading it half around a smooth grooved pulley or drum at each end. This alone will serve well; but in the complete form of the invention I employ an additional rubbing means. Near one end of the long heater I draw the twine at each passage through a contracted space between a fibrous mat and the smooth metal of the hot vessel, or between two surfaces of metal. By this apparatus I secure an efficient soaking of the twine with the sizing material, which, with the treatment ultimately bestowed, gives not only a very strong union of the fibers, but also a desirable glaze on the surface; and I secure, also, a just sufficiently rapid drying in the open air, with a limbering in bending around the curves at each end during the process, and not only a removal of all surplus sizing material, but also an unusually uniform distribution thereof and a smooth lay of the fibers, to produce a uniform and highly-finished twine.

The accompanying drawings form a part of this specification, and represent what I consider the best means of carrying out the invention.

Figure 11:
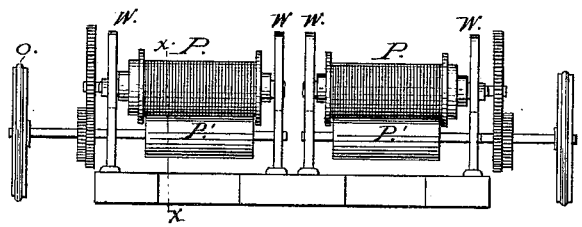
Figure 12:
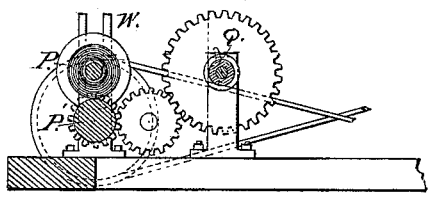

Figure 1 is a plan view of a double machine, adapted for treating two twines at once, and Fig. 2 is a vertical longitudinal section thereof. Fig. 3 is a vertical longitudinal section through the portion of the apparatus in which the twine is first treated. Fig. 4 is a corresponding section through the portion in which the twine is treated afterward. Fig. 5 is a plan corresponding to Fig. 3. Fig. 6 is a plan corresponding to Fig. 4. Fig. 7 is a detail view of the carrier which bears the eye through which the twine passes on its way to the bobbins, together with a section of the screw-shaft and hub and cogged gearing. Fig. 8 is a detail of the double screw-shaft, hub, and carrier. Fig. 9 is a detail of the block shown in Fig. 8. Fig. 10 is a cross-section through a modification. Fig. 11 is a view showing the relation of the bobbins to the operating-rollers. Fig. 12 is a section on line $x\ x$, Fig. 11, showing the open bearings for the yielding bobbin-journals and the gears connecting the thread carriers and rollers under the bobbins.

Similar letters of reference indicate corresponding parts in all the figures.

A is the upper surface or top of a table or long frame, held up a little above the floor by legs.

A' are brackets attached to one end of the table, adapted to support the spool B, loaded with the dry and unfinished twine.

The twine is in a continuous length, (indicated by M,) and may be of any approved length. My apparatus gives great facility for readjustment in case of breakage from too great tension or other cause.

C is a tank of sizing, having a hole in one end a little above the surface of the size, through which the twine is passed and is led over the roller C', thence under the roller $C^2$, and up half around the latter. The twine M is then led back again and down under the roller C', and up half around it and again forward and down, passing again under and half around the roller $C^2$. This operation may be repeated with advantage from two or three to twenty times, according to the thickness and condition of the twine.

D is a guide-rod having an eye near the bottom, which is in the proper position to guide the twine into the correct position in first coming into the tank.

The rollers C' $C^2$ may be smooth and the twine will guide itself, rubbing with a gentle force against itself at each crossing. After being thus carried back and forward and bent around the rollers while immersed in the sizing, the twine M is led several times around a snugger or rubber, E. This snugger is made of loosely-twisted rope or fibrous material, and the heavily-sized twine being led spirally around in a position parallel to the twist of the fibers of the snugger, it results, in practice, that the twine is bedded deeply into the fibrous wiper or snugger, and so long as the operation works well the twine follows a nearly-straight course through the snugger; but the snugger E constantly tends to assume a straight form, and to thereby throw the twine into a more helical or spiral path.

When, by any chance, the twine is broken, the fact that the wiping and snugging is done on the surface, or in a sunken groove opening to the surface, makes it easy to remove the broken end and to rapidly draw it forward and spiral it anew around the snugger and again resume the operation.

G is a long flat chamber of iron or other suitable material, filled with steam at a moderate pressure. I have in my experiments used from thirty to seventy pounds per square inch above atmosphere. A cock may control the flow from the boiler (not represented) through the pipe $f$. The water of condensation and a portion of the steam is allowed to escape constantly through a pipe, H. The twine, after being very thoroughly wiped by its passage through the deep groove which it forms in the snugger, is led close along the upper surface of the steam-box G and half around a roller, J, is led back through the open air close to the under side of the steam-box and wound half around a roller, I, thence again along the upper surface of the steam-box parallel to but not touching itself, and thus it is traversed back and forward as many times as may be found expedient.

I have experimented successfully with twine from one thirty-second of an inch in diameter up to one-quarter inch diameter, and have conducted the twine twenty-five times along close to the surface of the steam-box. The steam-box I have used is nine feet long and about nine inches wide and three inches thick.

Both the rollers I J are grooved, the bottoms of the grooves being smoothly rounded. I have not found it necessary to vary the grooves for different sizes of twine, but can do so, if desired.

I have applied the power to induce the several movements entirely on the single windlass or roller J, using tight and loose pulleys K K', with a belt from a steam-engine. (Not represented.) The other roller, I, is turned by the friction of the twine. The tank-rollers C' C² are turned by the same; and it will be understood that the bobbin B is turned by the simple act of drawing off the twine. I believe that the slight rubbing action due to this mode of driving contributes to the polish of the surface by inducing a slight friction; but I have not succeeded well in efforts to make this rubbing action still greater by slightly varying the diameters of the rollers I J at different points. The strain induced on the twine is liable to be too intense and to induce fracture.

After making the last traverse near the heated surface the twine is finished, and there remains simply to store it on a suitable bobbin, ball, or other receptacle.

P are the thread-bobbins, mounted in open bearings W. They are revolved by bearing upon the rollers P'. These rollers P' turn in contact with the thread or twine on the bobbins, which are revolved thereby, so that the bobbins move with equal velocity at all stages of the filling, and as they are filled they rise in the bearings W. Motion is imparted to the rollers by means of the belts $o$.

The twine is distributed on the bobbins by being carried through the eye Q in the carrier Q', traversed on a double screw-shaft, $Q^2$. The carrier is mounted on a hub, $Q^3$, which has a block, $Q^4$, and adjusting-screw $Q^5$. The block moves upon the double screw-threaded shaft, and carries the hub and carrier backward and forward with it.

The apparatus will succeed, as above described, without the additional rubbing which I prefer to give it near one end of the steam-chamber, and which I will now describe.

G' is a plate of smooth iron or steel secured on the top of the steam-chest G at one end. The top is plane, and serves as the bottom surface for my extra compressing and smoothing means. The other part (the top part) is partly a mat of fibrous material, which fits elastically upon the nearly-dried and smoothed twine, and partly a smooth plate.

I prefer, where the twine makes many traverses, that the first traverses shall be under the mat and the last half under a rigid plate. In the first part the mat presses gently above, holding the twine down upon the smooth iron surface below. In the last part the twine is held between two rigid smooth surfaces.

L' represents the mat, and L the smooth top iron.

The mat L' and the top iron, L, are held with provision for a slight yielding. They can readily adapt themselves to the size of the twine. The twine rolls sufficiently under such treatment to insure a practically-cylindrical condition when finished.

Modifications may be made in the forms of many of the details. The eye Q may be adjusted in various positions, or it may be dispensed with altogether and the apparatus will succeed.

One modification to which I attach much importance is to make the steam-box in the form of a double tube, inclosing the returns of the twine, as shown in Fig. 10. This may be done for a part of the distance with good effect; but it is important, however the steam-box shall be arranged, that the heat is communicated therefrom very thoroughly to the twine by virtue of the close proximity of the twine to the heated surface, and also that the twine be carried a considerable distance through the open air thus conditioned, so that the moisture may evaporate.

I prefer the form represented in Fig. 4 for the reason, among others, that it affords greater facility for supporting and properly warming the stationary ironing-plate G', which I esteem important in its ultimate effect on the finish of the twine.

The sizing may be applied hot, and thus the time of the drying may be somewhat hastened in treating large twine; but I have, in my experiments, used the sizing cold, and prefer it thus worked.

The rollers C' C² should be placed near the bottom of the sizing-tank, not only to allow a successful operation with but a small quantity of sizing, but also to insure that when a liberal quantity of sizing is used it shall be kept well milled or mixed by the rapid motion of these rollers and of the twine traversed thereon.

Pins g serve to keep the twine apart, and also serve to steady the top plate or rubbers L L'.

The speed may be varied by cone-pulleys or other approved devices.

I claim as my invention—

1. In a twine-finishing machine, the combination, with the sizing-tank thereof, having the two rollers C' and C² located at opposite ends of the tank, and a guide, D, located between them, of a snugger, E, formed to have the twine passed spirally about it and embedded in its fibers, substantially as shown, and for the purpose set forth.

2. In a twine-finishing machine, the combination, with means for saturating the twine with sizing and removing the surplus, of a heated box or case near which the twine is moved back and forward, and also one or more smooth metallic surfaces and interlying soft mat, against which the twine is pressed at each traverse, substantially as herein specified.

3. The combination, with the sizing-tank C, rollers C' C², and snugger E, having or provided with the deep spiral groove, of the heated box G, ironing-plate L, elastic mat L', top iron, G', smoothly-grooved rollers I J, and suitable storing means, P, and the means for operating the same, all substantially as herein specified.

In testimony whereof I have hereunto set my hand at New York city, New York, this 14th day of May, 1880, in the presence of two subscribing witnesses.

SAMUEL LUDLOW.

Witnesses:
CHARLES R. SEARLE,
CHARLES C. STETSON.